United States Patent
Wang et al.

(10) Patent No.: US 6,636,347 B1
(45) Date of Patent: Oct. 21, 2003

(54) PHOSPHORUS-SILICATE FIBERS SUITABLE FOR EXTENDED BAND AMPLIFICATION

(75) Inventors: Ji Wang, Painted Post, NY (US); Gang Qi, Painted Post, NY (US); Carlton M. Truesdale, Corning, NY (US); Douglas E. Goforth, Painted Post, NY (US); John D. Minelly, Painted Post, NY (US); Jeffrey T. Kohli, Corning, NY (US); Michael Thomas Murtagh, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/709,089

(22) Filed: Nov. 8, 2000

(51) Int. Cl.[7] .............................................. H04B 10/12
(52) U.S. Cl. ................................................... 359/341.5
(58) Field of Search ..................................... 359/341.5

(56) References Cited

U.S. PATENT DOCUMENTS

| | | | | | |
|---|---|---|---|---|---|
| 3,979,322 | A | * | 9/1976 | Alexeev et al. | 252/301.4 P |
| 4,110,093 | A | * | 8/1978 | Macedo et al. | 65/30.13 |
| 4,456,692 | A | * | 6/1984 | Dumbaugh et al. | 501/41 |
| 4,798,681 | A | | 1/1989 | Oversluizen et al. | |
| 4,798,768 | A | | 1/1989 | Oversluizen et al. | |
| 5,173,456 | A | * | 12/1992 | Hayden et al. | 252/301.4 P |
| 5,206,925 | A | * | 4/1993 | Nakazawa et al. | 216/24 |
| 5,225,925 | A | * | 7/1993 | Grubb et al. | 359/341.32 |
| 5,378,664 | A | * | 1/1995 | Becker et al. | 501/37 |
| 5,475,528 | A | * | 12/1995 | LaBorde | 359/341.5 |
| 5,508,235 | A | * | 4/1996 | Marker | 428/378 |
| 5,563,979 | A | * | 10/1996 | Bruce et al. | 372/6 |
| 5,798,306 | A | * | 8/1998 | Dickinson, Jr. | 252/301.4 F |
| 6,160,944 | A | * | 12/2000 | Payne et al. | 385/129 |
| 6,184,403 | B1 | * | 2/2001 | Welch et al. | 427/248.1 |

FOREIGN PATENT DOCUMENTS

| | | | | |
|---|---|---|---|---|
| DE | 3435133 A1 | * | 4/1985 | C03C/3/16 |
| EP | 0533 324 A | | 3/1993 | H01S/3/17 |
| WO | WO 93 24422 A | | 12/1993 | C03B/37/018 |
| WO | WO 98 36477 A | | 8/1998 | H01S/3/091 |

OTHER PUBLICATIONS

Lumholt et al. "Rare Earth–Doped Integrates Glass Components: Modeling and Optimization" Feb. 1995, Journal of Lightwave Technology, vol. 13, No. 2, pp. 275–282.*

Endo et al. "High Concentration Er–Doped Fiber for Efficient L–Band Amplification with Short Length" Oct. 1999, APCC/OECC '99 col.2 pp. 1356–1357.*

Carter et al "Flash–Condensation Technique for the Fabrication of High–Phosphorus–Content Rare–Earth–Doped Fibres", Electornics Letters, IEE Stevenage, GB, vol. 28, No. 21, Oct. 8, 1992, pp. 2009–2011.

Kakui et al., "Optical Amplification Characteristics around 1.58 $\mu$m of Silica–Based Erbium–Doped Fibers Containing Phosphorous/Alumina as Codopants" published in the Technical Digest, Optical Amplifiers and their Applications Conference, 1998.

Vienne et al., "Fabrication and Characterization of $Yb^{3+}$:$Er^{3+}$ Phosphosilicate Fibers for Lasers" published in Journal of Lightwave Technology, vol. 16, No. 11, Nov. 1998.

Vienne et al., "Role of Aluminum in Ytterbium–Erbium Codoped Phosphoaluminosilicate Optical Fibers", Optical Fiber Technology 2, article No. 0044, pp. 387–393.

* cited by examiner

*Primary Examiner*—Thomas G. Black
*Assistant Examiner*—Stephen Cunningham
(74) *Attorney, Agent, or Firm*—Svetlana Z. Short

(57) ABSTRACT

An optically active phosporus-silicate glass when pumped to directly excite Er ions, provides gain in 1565 nm to 1620 nm range and comprises in weight percent:

$SiO_2$ 50 to 92%;
$Er_2O_3$ 0.01 to 2%;
$P_2O_5$ greater than 5%; and
$Al_2O_3$ 0.0 to 0.3%.

30 Claims, 3 Drawing Sheets

PHOSPHORUS-SILICATE FIBERS SUITABLE FOR EXTENDED BAND AMPLIFICATION

BACKGROUND OF THE INVENTION

1. Field of the Invention

This invention relates to optical fibers for use in optical fiber amplifiers and more particularly to phosphorus-silicate fibers.

2. Technical Background

Most of the current erbium doped fiber amplifiers (EDFAs) operate in the conventional band (C-band), approximately from about 1525 nm to about 1565 nm. Driven by the rapid growth in Internet, Metro and LAN applications, the wavelength division multiplexing (WDM) optical transmission systems employing EDFAs have to cope with the increasingly large capacity demands. Thus, it is important to develop new EDFA's that not only provide a flat-gain shape, but also have the widest possible bandwidth.

Er-doped Al—Ge-Silica (Er—Al—Ge—Si) fibers have been a common choice for use in EDFA's operating in the long wavelength band (L-band) from 1565 nm to 1605 nm. However, in order to utilize the 1565 nm to 1620 nm capacity offered by the commercially available transmission fibers, there is a need to further increase EDFA's signal band capacity to 1620 nm and beyond, a range known as the extended L-Band.

An article entitled "Optical Amplification Characteristics around 1.58 µm of Silica-Based Erbium-Doped Fibers Containing Phosphorous/Alumina as Codopants" published in the Technical Digest, Optical Amplifiers and their Applications Conference, 1998, describes alumina- phosphorus-silicate fibers. This article discloses that these fibers can be utilized in the L-band range. Table 1 of the article describes the core composition of three different fiber types: A, B, and C with varying concentrations of alumina and phosphorus. Type A fiber contains about 7.8 weight percent (wt %) alumina and no phosphorus. Type B fiber contains about 2 wt % alumina and 5 wt % phosphorus oxide. Type C fiber contains aluminum concentration of 0.3 wt % and phosphorus oxide concentration around 8 wt %. FIG. 3 of this article depicts the gain curve for each of those fibers. The gain curve for the Type B fiber is lower than that of Type A fiber, primarily because of lower Er concentration. However, although the amount of Er is identical in Type A and C fibers, the Type C fiber extends the L-band gain to longer wavelengths, relative to that of the Type A fiber. Type C fiber, however, provides smaller gain amount and has more gain ripple. Finally, because of its core/clad composition, the Type C fiber would have a relatively low refractive index delta between the core and the cladding ($\Delta N < 0.004$), which results in low pump efficiency and high bending sensitivity. This would, in turn, result in a very large size module, due to high total power and a large coil diameter, and would make the amplifier commercially impractical.

The strong presence of $AlPO_4$ in making silica-based Al—P—Si fibers such as fibers Types B and C has been shown to be problematic. The $AlPO_4$ units tend to cluster away from the silica-based structural network and form microcrystals (with typical grain sizes of less than 100 µm). These microcrystals cause high scattering loss in the resultant fibers. Moreover, the $AlPO_4$ units have a lower refractive index than those fibers with $P_2O_5$ and $Al_2O_3$. A relatively high $\Delta N$ of about 1% is commonly desired for fibers utilized in EDFA applications. More alumina and phosphorus would be desirable to raise the refractive index of the core relative to the clad and to obtain optimal gain shape in the output of EDFA. However, elevated Al and P levels lead to the formation of a high concentration of $AlPO_4$ units in the glass, which in turn result in lower $\Delta N$, and further aggravate the clustering and the resulting scattering problem.

An article entitled "Fabrication and Characterization of $Yb^{3+}:Er^{3+}$ Phosphosilicate Fibers for Lasers" published in Journal of Lightwave technology, Vol. 16, No. 11, November 1998 also discloses optical fibers with optically active glass. This article, however, is directed to high power fiber lasers operating at 1.5 µm, and specifically to Yb and Er co-doped fiber lasers. The article teaches that in order to achieve high output power a 1064 nm Nd: YAG laser is used to activate Yb elements, thus indirectly pumping Er ions. The excited Yb elements transfer energy to the Er ions, enabling optical signal amplification from the Er ions. More specifically, this article discloses that a high power (800 mW) Nd:YAG laser was used to achieve the high output power from the optical fiber. In a commercially deployable amplifier such a Nd:YAG pump laser would be prohibitively large. Therefore, a Nd:YAG laser would not be utilized in a typical optical amplifier where component miniaturization and space conservation are extremely important. Furthermore, such a laser can not be used effectively to directly pump Er ions.

SUMMARY OF THE INVENTION

According to one aspect of the present invention an optically active phosporus-silicate glass when pumped to directly excite Er ions, provides gain in 1565 nm to 1620 nm range and comprises in weight percent:

$SiO_2$ 50 to 92%;
$Er_2O_3$ 0.01 to 2%;
$P_2O_5$ greater than 5%; and
$Al_2O_3$ 0.0 to 0.3%.

According to an embodiment of the present invention this glass includes, in weight percent: $SiO_2$ 65 to 92%; $Er_2O_3$ 0.01 to 1%; $P_2O_5$ greater than 5%; $Al_2O_3$ 0 to 0.3%; and one or more oxides of the following elements: Ge, Yb; Y; Ga; Ta, Gd, Lu, La, and Sc in an amount from 0.1% to 20% wt %.

An advantage of the inventive glass is that it can be used in optical gain medium fiber in L-band optical amplifiers, extending the L-band beyond 1605 nm to 1620 nm or beyond.

The foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Figure 1:
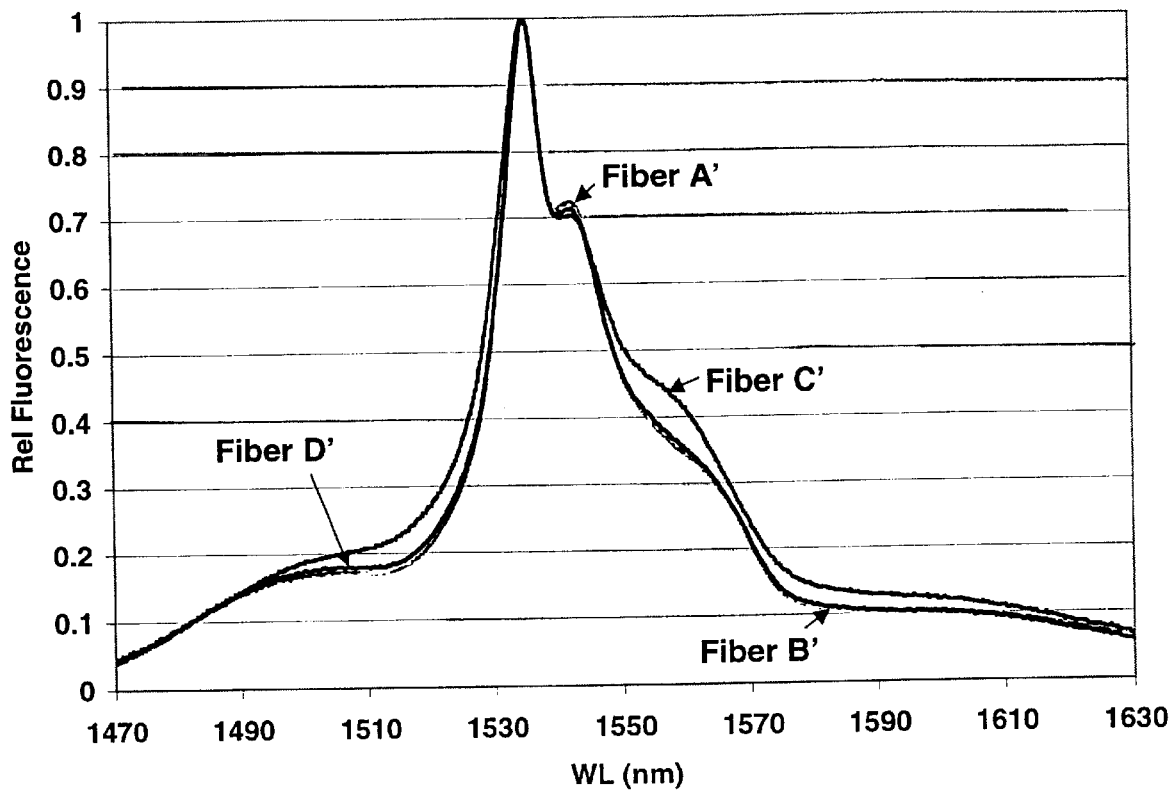
FIGS. 1 is a graph of fluorescence spectrums of three $Er^+$ doped phospho-silicate glass fibers containing less than 0.03 Wt % of $Al_2O_3$ and that of phospho-silicate glass fiber containing a relatively large amount of $Al_2O_3$.

One preferred embodiment of the present invention includes Er-doped, $Al_2O_3$-free, phospho-silicate composition which is suitable for use in an optical fiber as gain medium in the optical amplifiers suited for the extended L-band. Fiber with $Al_2O_3$-free core compositions provides more gain at large wavelengths than fibers containing even small concentrations of alumina. Advantages of this fiber are low passive loss and relatively high refractive index delta. Passive loss (also referred to as background loss) includes, for example, loss due to scatter from scattering centers (for example, microcrystals and refractive index discontinuities) and loss due to spurious absorption (water or iron, or other metal absorption, for example). Refractive index delta is defined as core index minus cladding index, divided by cladding index, or $$\Delta N = \left( \frac{n_{core} - n_{clad}}{n_{clad}} \right).$$

Preferably, these fibers have a refractive index delta of $\Delta N$ that is greater than 0.005. More preferably, $0.007 \leq \Delta N \leq 0.015$ and even more preferably $0.008 \leq \Delta N \leq 0.013$. In some embodiments the fiber will have $\Delta N$ in the range $0.009 \leq \Delta N \leq 0.011$. These $\Delta N$ values minimize fiber bend losses and result in better pump power conversion efficiency.

To further modify the extended L-band gain spectra, we utilize one or more gain modifying or gain flattening agents. These agents may be, for example, Ga and Sb. It is preferred that these agents comprise 0.5 to 20 wt % of the glass. These elements overcome the dip in the gain curve at about 1575 nm (see FIG. 2) and improve gain.

An increase in phosphorus concentration increases the refractive index of the glass and, correspondingly, the lower phosphorus concentration the lower is the refractive index. The addition of Ge, Ta, Yb, La, Y or other index increasing elements such as optically inactive elements with an atomic number greater than 15 increases the refractive index of the glass and compensates for lower phosphorus concentration. The optically inactive elements are elements that show substantially no absorption or emission in the 800 nm–1700 nm wavelength range. Thus, if the amount of phosphorus in the fiber core is less than 10 percent, it is preferable that these elements comprise 0.1 wt % to 20 wt % of the core's glass composition. It is preferable that they comprise 1 to 15 wt %, more preferable that they comprise 1–10 wt % and most preferable that they comprise 1–5 wt % of the total glass composition.

It is also preferred that one or more of the following elements be utilized as Er ion de-clustering agents: Yb, Y, Sc, La, Ga, Gd and Lu. It is preferred, when Er concentration is high (0.1 wt %, for example) that these de-clustering agents comprise 0.5 to 20 wt % of the glass composition. This group of elements has no detrimental effect on gain shape. These elements, to our knowledge, do not form complex unit formation with $P_2O_5$, but have shown to produce some degree of the desired broadening and Er-ion de-clustering effect when incorporated into rare earth-doped silica glasses.

FIG. 1 shows that the spectral emissions (fluorescence) from four rare-earth doped phosphosilicate fibers. More specifically, FIG. 1 depicts four curves corresponding to four optically active fiber core glass compositions A', B', C', D', respectively. An optically active glass contains a rare-earth material and provides gain in a range from about 800 to about 1700 nm. For example, an Er doped optically active glass provides gain in the 1500 nm to 1650 nm range. The first phosphorus-silicate composition A' includes about 20 wt % of phosphorus-oxide (for example, $P_2O_5$), about 10 wt % of Yb-oxide ($Yb_2O_3$) and, about 0.25 wt % of erbium oxide (for example, $Er_2O_3$) and about 4.5wt % of Al-oxide (for example, $Al_2O_3$).

The second composition B' includes about 23wt % of phosphorus-oxide, about 2.5% wt5 of Yb-oxide and about 0.19 wt % of erbium oxide. The second glass composition includes no aluminum. The third composition C' includes about 20 wt % of phosphorus oxide, no Yb-oxide, no Aluminum oxide and about 0.25 wt % of erbium oxide. The fourth composition D' includes about 22 wt % of phosphorus oxide, about 2 wt % of Yttrium oxide and about 0.2 wt % of erbium oxide. The fourth composition contains no aluminum oxide.

Considering the issues mentioned above with regard to the $Al_2O_3$ compositions, it is highly advantageous to use low Al-oxide and even more preferably to use the $Al_2O_3$-free phosphosilicate compositions to overcome those problems.

Figure 2:
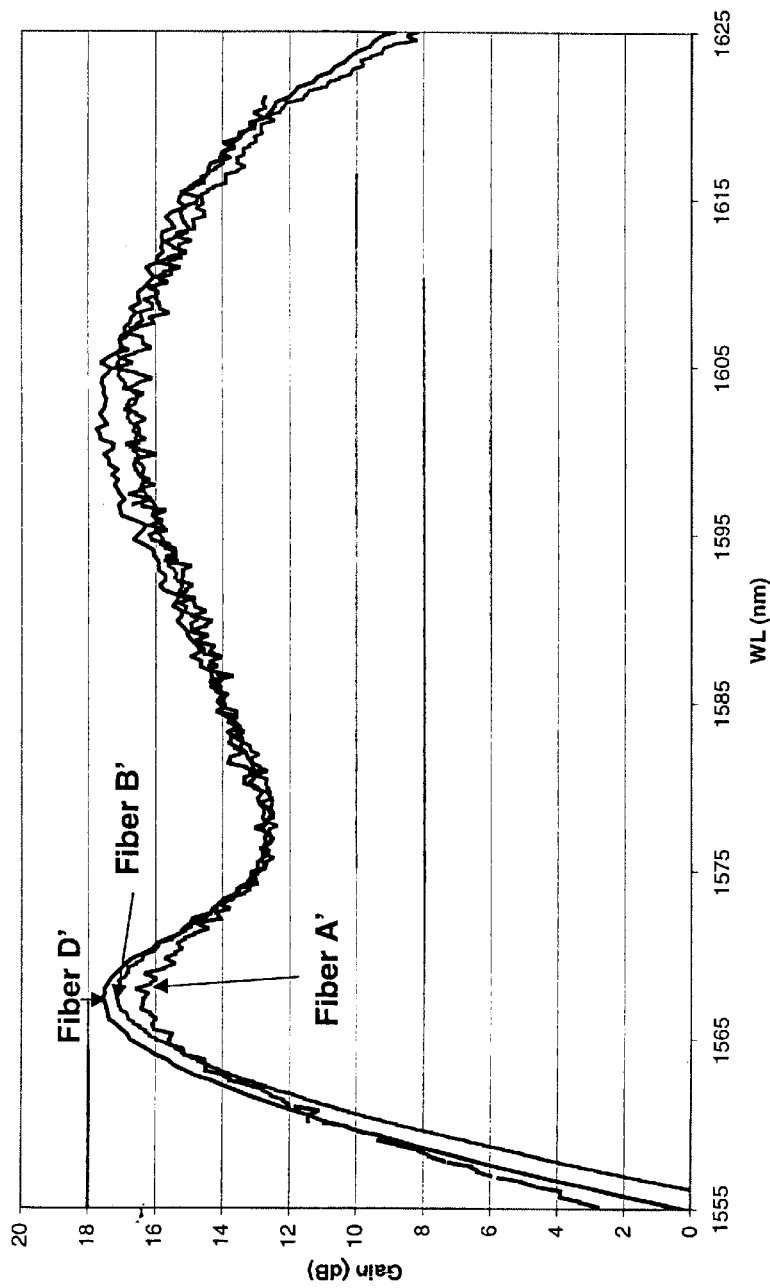
FIG. 2 is a plot of calculated gain vs. wavelength for these fibers.

FIG. 2 illustrates gain spectrum for these fibers and shows that the gain spectrum extends into 1620 nm range and beyond.

Figure 3:
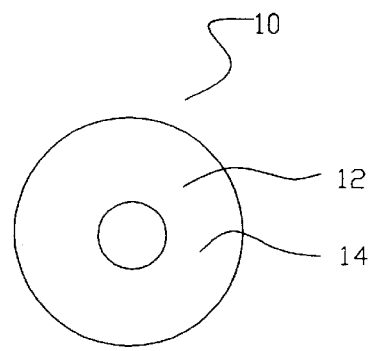
FIG. 3 is a schematic cross-sectional illustration of an improved $Er^+$ doped phospho-silicate glass fiber.

Therefore, using Er-doped phospho-silicate based compositions ($P_2O_5$, 2–45 wt %), with low concentration (for example, less than 0.3 wt %, and preferably less than 0.2 wt %) of aluminum is highly advantageous oxide for use in the extended L-band amplifier applications. It is even more preferrable that the amount of the aluminum oxide be less than 0.1 wt % and preferably less than 0.05 wt %. It is most preferrable that these oxide phosphosilicate based compositions be essentially aluminum free. Referring to FIG. 3, an examplarary embodiment optical fiber 10 according to the invention includes a core 12 with a low concentration of aluminum-oxide (less than 0.3% and preferably 0%) and at least one cladding 14 surrounding the core. More specifically, the core 12 includes, in weight percent: $65\% \leq SiO_2 \leq 92\%$; $0.01\% \leq RE_xO \leq 2\%$, where RE is a rare earth material other tan Yb and x,y are integers greater than 0 (for example, $Er_2O_3$); $P_2O_5 > 8\%$; and $0.0\% \leq Al_2O_3 < 0.3\%$. It is preferable that the rare eart material be erbium. It is preferable that the amount of $Er_2O_3$ be 0.1 to 1.0 wt % and more preferable that the amount of $Er_2O_3$ be be 0.2 to 0.4 wt %. This amount of $Er_2O_3$ provides good gain characteristics without too much clustering. As discussed above, the core 12 may also include index raising co-dopants in order to achieve the refractive index delta $\Delta N$ of greater than 0.005. The core 12 may also have the following composition (in weight percent): $50\% \leq SiO_2 \leq 92\%$; $0.01\% \leq Er_2O_3 \leq 1\%$; $P_2O_5 > 5\%$; $0.0\% \leq Al_2O_3 \leq 0.3\%$; and or more of the above described index raising elements in the amount of 0.1 wt % to 20 wt %. In this embodiment the cladding 14 of the optical fiber 10 contains Si and may contain P, F, and/or Ge. More specifically, the cladding 14 contains less than 5 wt % $P_2O_5$, less than 1 wt % of F, and about 2 wt % of Ge.

Tables 1 and 2 disclose examples of chemical compositions and important parameters of various examplarary phosphorus silicate fibers made with such compositions. More specifically, Table 1 provides fiber composition data and measured data from some of these fibers. This measured data includes mode field diameters (MFD) at 1500 nm, cut-off wavelengths (nm), and total background noise (TBN) measured at 1250 nm, 1300 nm and 1619 nm, for each of the optical fibers.

TABLE 1

| Fiber # | P$_2$O$_5$, wt % | Yb$_2$O$_3$, wt % | Er$_2$O$_3$, ppm | Al$_2$O$_3$, wt % | GeO$_2$, wt % | λ Cutoff | MFD @ 1500 | TBN @ 1250 nm | TBN @ 1300 nm | TBN @ 1690 nm |
|---|---|---|---|---|---|---|---|---|---|---|
| 1 | 19.46 | 2.65 | 2100 | 0.245 | 0 | 1380 | 6.4 | 38 | 60 | 28 |
| 2 | 19.94 | 5.4 | 3600 | 0.33 | 0.23 | 1180 | 6.84 | 42 | 67 | 26 |
| 3 | 14 | 2.4 | 1700 | 0.05 | 0 | 1160 | 7.7 | 31 | | 52 |
| 4 | 15.24 | 2.65 | 1900 | 0 | 0 | 1170 | 7.66 | 36 | | 17 |
| 5 | 17 | 3.18 | 2100 | 0 | 0 | | | | | |
| 6 | 22.07 | 3.8 | 2600 | 0 | 0.138 | 1130 | 7.2 | 88 | 109 | 108 |
| 7 | 23.66 | 3.34 | 2300 | 0 | 0.107 | | | | | |
| 8 | 24.52 | 4.32 | 3100 | 0 | 0.123 | | | | | |
| 9 | 22.52 | 10.00 | 10,000 | 0 | 0 | 1200 | 5.35 | 279 | 37 | 139 |

Table 2 specifies pump power utilized to excite Er ions in the optical fiber, the signal power provided with the tunable laser (TLS pwr) and the specific wavelengths ranges (in nm, tabulated in the wavelength column) for the fibers 2 and 3 of Table 1. Table 2 shows that these fibers have very low polarization mode dispersion (PMD) at the specified wavelength ranges. (It is noted that the signal wavelength in a telecommunication system is typically about in the 1550 nm.)

TABLE 2

| Fiber # | Pump Power (mA) | TLS pwr (dBm) | Wavelength (nm) | PMD* (ps) | PMD (ps/m) |
|---|---|---|---|---|---|
| 3 | 100 | 1 mW | 1575–1592 | 0.02 | 0.001 |
| 3 | None | 1 mW | 1575–1592 | 0.02 | 0.001 |
| 2 | None | 1 mW | 1435–1450 | 0.019 | 0.001 |
| 2 | 100 | 1 mW | 1575–1592 | 0.019 | 0.001 |
| 2 | None | 1 mW | 1575–1592 | 0.039 | 0.001 |
| 2 | None | 1 mW | 1435–1450 | 0.02 | 0.001 |

*Polarization mode dispersion

Figure 4:
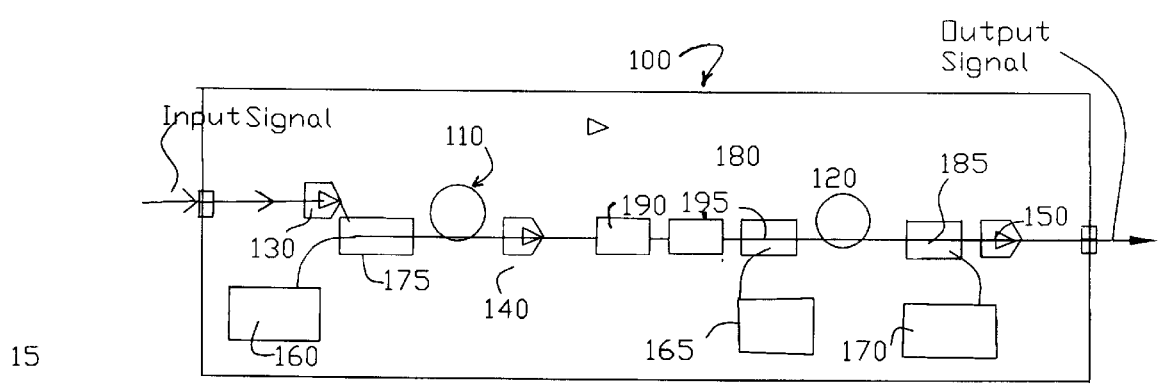
FIG. 4 is a schematic illustration of an optical amplifier that utilizes the optical fiber of FIG. 3.

These fibers may be used in an extended L band amplifier. A schematic of an exemplary amplifier 100 is shown in FIG. 4. The amplifier 100 operates in the 1565 to 1620 nm band and as illustrated includes two coils 110, 120 made of low aluminum (and preferably no aluminum) phosphorus silicate fiber 10. These coils may have identical or differing compositions. Those skilled in the art will recognize that an amplifier may also be designed with a single coil or with more the two coils, of a fiber according to the present invention. In addition, this amplifier may also include one or more of the following components: an isolator, avariable optical attenuator, a filter, or a grating. The fiber coils 110 and 120 are utilized to provide gain to signals in the extended L-band range.

The amplifier 100 also includes optical isolators 130, 140, and 150. These isolators prevent unwanted reflections between gain stages (corresponding to fiber coils 110 and 120) and other optical components.

The optical pumps 160, 165, and 170 are utilized to directly excite the Er ions to an upper level, initiating stimulated emission and gain. Pumps 160, 165, and 170 are either 1480 nm or 980 nm pumps. When Yb is not used as a codopant (Y can be used as a de-clustering agent, if needed) both 980 and 1480 pumps can be utilized to directly excite Er ions. In the presence of Yb only 1480 pumps are used. Therefore, we do not utilize a 1060 nm pump to excite Yb ions and, thus, do not indirectly transfer energy to Er by energy transfer from Yb ions to Er ions.

Wavelength Division Multiplexers (WDMs) 175, 180 and 185 or other pump/signal combiners combine the pump and signal light into one fiber, thus providing both the signal light and pump energy to the first gain stage. The gain flattening filter (GFF) 190 levels the gain shape to an acceptable amount. The variable optical attenuator (VOA) 195 may also be used to control the signal level. Other optical components that may be included are: pump or signal taps (for monitoring), circulators (for signal routing), optical filters, fiber gratings, signal multiplexers and demultiplexers, signal add/drops, or dispersion compensation modules. Those skilled in the art will appreciate that an amplifier according to the present invention may include other optical components, or the above described optical components in different arrangements, chosen as to result in desired output and performance characteristics.

Accordingly, it will be apparent to those skilled in the art that various modifications and adaptations can be made to the present invention without departing from the spirit and scope of the invention. It is intended that the present invention cover the modifications and adaptations of this invention as defined by the appended claims and their equivalents.

What is claimed is:

1. An optically active phosphorus-silicate glass comprising in weight percent: SiO$_2$ 50 to 92%; Er$_2$O$_3$ 0.01 to 2%; P$_2$O$_5$ greater than 5%; and Al$_2$O$_3$ 0.0 to 0.245%, wherein said optically active glass is pumped to directly excite most Er ions and provides gain in 1565 nm to 1620 nm range.

2. An optically active glass according to claim 1, wherein the amount of P$_2$O$_5$ is greater than 8 wt %.

3. An optical fiber comprising an optically active glass of claim 1.

4. An optical amplifier comprising an optical fiber of claim 3.

5. An optically active glass according to claim 1, wherein concentration of Al$_2$O$_3$ is ≦0.1 wt %.

6. An optical amplifier according to claim 5 wherein said optical pump is a 1480 nm pump.

7. An optically active glass according to claim 2, wherein Al$_2$O$_3$ is 0.0 to 0.05 wt %.

8. An optical amplifier according to claim 7 wherein said optical pump is a 1480 nm pump.

9. An optically active phosphorus-silicate glass comprising in weight percent: SiO$_2$ 50 to 92%; Er$_2$O$_3$ 0.01 to 2%; P$_2$O$_5$ greater than 5%; and Al$_2$O$_3$ 0.0 to 0.3%, wherein said optically active glass is pumped to directly excite Er ions provides gain in 1565 nm to 1620 nm range, wherein the concentration of Al$_2$O$_3$ is ≦0.1 wt % and the amount of P$_2$O$_5$ is greater than 15 wt %.

10. An optically active glass according to claim 9, wherein the amount of P$_2$O$_5$ is greater than 20 wt %.

11. An optically active glass according to claim 1 further comprising in the amount of 0.1% to 20% of one or more of the elements increasing refractive index, said elements being selected from: Ge, Y, Ga, Ta.

12. An optical fiber comprising an optically active glass of claim 11.

13. An optical amplifier comprising: an optical pump and an optical fiber of claim 12, wherein said Er ions are directly excited by energy provided by an optical pump.

14. An optically active glass according to claim 1, further comprise 0.5 to 20 wt % of Er-ion de-clustering agents, said de-clustering agents being selected from a group of: Y, Sc, La, Ga, Gd and Lu.

15. An optically active glass according to claim 1, further comprising 0.5 to 20 wt % of gain fattening agents said gain-flattening agents being selected from a group of: Ga and Sb.

16. An optically active glass comprising in weight percent:

$SiO_2$ 50 to 92%;

$E_2O_3$ 0.01 to 1%;

$P_2O_5$ greater than 5%;

$Al_2O_3$ 0 to 0.245%; and one or more of the following elements to increase the index of refraction Ge, Y; Ga; Ta in the amount of 0.1 to 20%;

wherein said optically active glass is pumped to directly excite most rare earth ions and provides gain in 1565 nm to 1620 nm range.

17. An optically active glass according to claim 16, wherein the amount of $P_2O_5$ is greater than 10 wt %.

18. An optically active glass according to claim 16, were in the amount of $P_2O_5$ is greater than 15 wt %.

19. An optically active glass according to claim 16, wherein the amount of $E_2O_3$ is greater than 0.1 wt %.

20. An optically active glass according to claim 19, wherein the amount of $E_2O_3$ is 0.2 to 0.4 wt %.

21. An optical fiber comprising: a core and at least one cladding surrounding said core, said core comprising with the optically active glass of claim 1, said cladding containing at least one of the following elements: P, F, and Ge.

22. The optical fiber of claim 21, wherein said core contains Ge.

23. The optical fiber of claim 22, wherein the amount of Ge is said core is less than 0.5 wt %.

24. An optical fiber comprising an optically active glass of claim 16, said optical fiber including: a core having refractive index $N_{core}$, said core comprising the optically active glass of claim 1; at least one cladding surrounding said core, said cladding having refractive index $N_{clad}$; wherein $0.007 \leq \Delta N \leq 0.015$, where $\Delta N = (N_{core} - N_{clad})/N_{clad}$.

25. On optical fiber according to claim 24, wherein $0.008 \leq \Delta N \leq 0.013$.

26. On optical fiber according to claim 25, wherein $0.009 \leq \Delta N \leq 0.011$.

27. On optical amplifier comprising: the optical fiber of claim 21, said amplifier further including at least one optical pump providing optical radiation to said optical fiber such that said Er ions are being directly pumped by said pump, and at least one other optical component.

28. An optical amplifier according to claim 27 wherein said optical pump is a 1480 nm pump.

29. An optical amplifier according to claim 27 wherein said optical pump is a 980 nm pump.

30. An optical amplifier according to claim 27, wherein said optical component is selected from the group of: isolator, variable optical attenuator, filter, or grating.

* * * * *